United States Patent
Dan et al.

(10) Patent No.: US 6,742,019 B1
(45) Date of Patent: May 25, 2004

(54) SIEVED CACHING FOR INCREASING DATA RATE CAPACITY OF A HETEROGENEOUS STRIPING GROUP

(75) Inventors: Asit Dan, Pleasantville, NY (US); Dinkar Sitaram, Bangalore (IN); Junehwa Song, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,324

(22) Filed: Jul. 23, 1999

(51) Int. Cl.$^7$ ............................................. G06F 15/167
(52) U.S. Cl. ........................................ 709/213; 711/111
(58) Field of Search ................................ 709/204, 231, 709/225, 202, 217, 232, 226, 234, 105, 218, 245, 212, 102, 227; 711/112, 114, 113, 119, 118, 111; 714/5; 370/310, 233, 230, 412, 60, 422; 710/4, 131, 60; 725/92, 115; 345/328, 169; 358/1.14; 340/825; 375/240

(56) References Cited

U.S. PATENT DOCUMENTS

| | | | | |
|---|---|---|---|---|
| 5,361,063 A | * | 11/1994 | Jaffe et al. | 340/825 |
| 5,440,698 A | * | 8/1995 | Sindhu et al. | 709/225 |
| 5,463,620 A | * | 10/1995 | Sriram | 370/60 |
| 5,473,362 A | * | 12/1995 | Fitzgerald et al. | 725/92 |
| 5,586,264 A | * | 12/1996 | Belknap et al. | 725/115 |
| 5,621,894 A | * | 4/1997 | Menezes et al. | 709/227 |
| 5,668,948 A | * | 9/1997 | Belknap et al. | 709/231 |
| 5,680,538 A | * | 10/1997 | Jones et al. | 714/5 |
| 5,689,679 A | * | 11/1997 | Jouppi | 711/112 |
| 5,787,472 A | | 7/1998 | Dan et al. | 711/134 |
| 5,809,239 A | | 9/1998 | Dan et al. | 395/200.33 |
| 5,815,662 A | * | 9/1998 | Ong | 709/217 |
| 5,838,912 A | * | 11/1998 | Poon et al. | 709/204 |
| 5,860,091 A | * | 1/1999 | DeKoning et al. | 711/114 |
| 5,884,028 A | * | 3/1999 | Kindell et al. | 709/234 |
| 5,909,693 A | * | 6/1999 | Martini | 711/114 |
| 5,964,829 A | * | 10/1999 | Ozden et al. | 709/102 |
| 5,991,812 A | * | 11/1999 | Srinivasan | 709/232 |
| 6,078,943 A | * | 6/2000 | Yu | 709/105 |
| 6,246,672 B1 | * | 6/2001 | Lumelsky | 370/310 |
| 6,285,361 B1 | * | 9/2001 | Brewer et al. | 345/328 |
| 6,349,357 B1 | * | 2/2002 | Chong, Jr. | 711/111 |
| 6,359,861 B1 | * | 3/2002 | Sui et al. | 370/230 |
| 6,363,077 B1 | * | 3/2002 | Wong et al. | 370/422 |
| 6,385,673 B1 | * | 5/2002 | DeMoney | 710/60 |
| 6,430,191 B1 | * | 8/2002 | Klausmeier et al. | 370/412 |
| 6,448,958 B1 | * | 9/2002 | Muta | 345/169 |
| 6,470,378 B1 | * | 10/2002 | Tracton et al. | 709/203 |
| 6,529,286 B1 | * | 3/2003 | King | 358/1.14 |
| 6,560,282 B2 | * | 5/2003 | Tahara et al. | 375/240.02 |

OTHER PUBLICATIONS

Wu et al, Iterative Cache Simulation of Embedded CPUs with Trace Stripping, IEEE 5/99.*

Brustoloni, Interoperation of Copy Avoidance in Network and File I/O, IEEE 6/99.*

"A Generalized Interval Caching Policy for Mixed Interactive and Long Video Workloads", A. Dan, et al.

* cited by examiner

Primary Examiner—Marc D. Thompson
Assistant Examiner—Thong Vu
(74) Attorney, Agent, or Firm—Gail H. Zarick; Anne V. Dougherty

(57) ABSTRACT

Under the present invention, a small cache is used for the selective buffering of devices of a heterogeneous striping group (i.e., striping group made of devices with unequal capacities) to match the load on each device to its capacity. The inventive caching algorithm utilizes a device map, or disk map, and applies a cache distribution factor for each device of a group to determined how to selectively buffer blocks read from different devices of a striping group; thereby placing different loads on the different devices of a striping group in accordance with their capacities.

20 Claims, 14 Drawing Sheets

DISK MAP 50

| DISK ID | CACHE DISTRIBUTION FACTOR(CDF) | CACHE DISTRIBUTION COUNTER(CDF) |
|---|---|---|
| 52 | 53 | 54 |

FIG.5

DISK ACCESS TABLE

| DISK ID | ACCESS FLAG |
|---|---|
| D1 | YES |
| D2 | NO |
| | |
| | |

FIG.6

| DISK STATUS TABLE | | |
|---|---|---|
| DISK ID | REMAINING CAPACITY | TOTAL CAPACITY |
| | | |

FIG.8

| 90 ↘ | 92 | 93 | 94 |
|---|---|---|---|
| SEGMENT ID | SEGMENT SIZE | CACHE STATUS | STATISTICS |
| 91 | | | |

FIG.9A

| 60 ↘ | 96 | 97 | 98 | 99 |
|---|---|---|---|---|
| STREAM ID | STREAM STATUS | CACHE ACCESS FLAG | VIDEO ID | POSITION |
| 95 | | | | |

FIG.9B

SIEVED CACHING FOR INCREASING DATA RATE CAPACITY OF A HETEROGENEOUS STRIPING GROUP

FIELD OF THE INVENTION

The present invention relates to a multimedia server environment and more particularly to a movie-on-demand system of the type wherein multiple clients are serviced by video streams delivered from a central video server location.

BACKGROUND OF THE INVENTION

A central server location may be composed of a plurality of disks and/or back-end servers for storing the content. To alleviate the effects of disk bandwidth limitations and to reduce movement of data from the disks to the front-end nodes, files are often cached at the front-end nodes. With a smaller number of requesters per node, a relatively large amount of buffer is required to obtain significant hit ratios.

Frequency-driven caching has been used to improve cache hit ratios. As an example, interval caching is an effective buffering method which has been used for video-on-demand servers. With interval caching, pre-fetched data, which is to be used again by another device in the near future, will be cached. The interval caching algorithms generally compute the interval between requests and, thereafter, the system will cache the videos which have the shortest predicted interval between requests.

Most frequency-driven caching algorithms, including interval caching algorithms, reduce the load uniformly on all storage devices of an array of discs (i.e., a striping group) by caching all the blocks in the intervals between the streams. It is likely, however, that a caching environment will have a non-uniform array of discs, for example, including newer discs which have greater capacity (in terms of size and speed) than have the discs which had been developed under older technology. Consequently, when applying prior art caching algorithms to the content stored in a striping group with discs of heterogeneous capacities, the higher capacity discs will be underutilized.

It is, therefore, an object of the present invention to provide a caching system and method which maximizes system performance and resource utilization.

It is another object of the invention to provide a caching system and method which selectively buffers content from certain devices in a striping group whereby there are different buffer hit ratios to different devices in a striping group.

SUMMARY OF THE INVENTION

The foregoing and other objectives are realized by the present invention wherein a small buffer is used for the selective buffering of devices of a heterogeneous striping group (i.e., striping group made of devices with unequal capacities) to match the load on each device to its capacity. The inventive caching algorithm utilizes a device access data structure, such as a disk map or disk access table, and selectively buffers the blocks read from different devices of a striping group; thereby placing different loads on the different devices of a striping group in accordance with their capacities.

BRIEF DESCRIPTION OF THE DRAWING

The invention will now be described in greater detail with specific reference to the appended drawings wherein:

FIG. 5 shows the entries in a disk map created in accordance with the present invention;

FIG. 6 depicts a disk access table created in accordance with the present invention;

FIG. 8 provides an illustration of a disk status table for use with the present invention;

FIGS. 9A and 9B show the segment table and stream table data structures used in the operation of the present cache management method;

DETAILED DESCRIPTION OF THE PREFERRED EMBODIMENT

Various caching algorithms (e.g., whole file caching, Interval Caching, etc.) have been proposed for server environments to reduce the load on the back-end devices associated with the server. The traditional caching algorithms reduce the load uniformly on all devices of a striping group by caching all the blocks in some segments of the files (e.g., whole files, intervals between the streams, etc.). These segments are referred to as the cached segments. Under the present invention, not all blocks of cached segments are retained in the buffer/cache. Hence, this is referred to as Sieved Caching. The slower devices are preferentially buffered while blocks stored at the faster devices will not be cached, such that the buffer hit ratio will be different for different devices within the same striping group. This can be used to ensure that the different devices within a striping group "run out" of capacity at the same time and therefore ensure that the capacities of all of the different devices are fully utilized.

Figure 1:
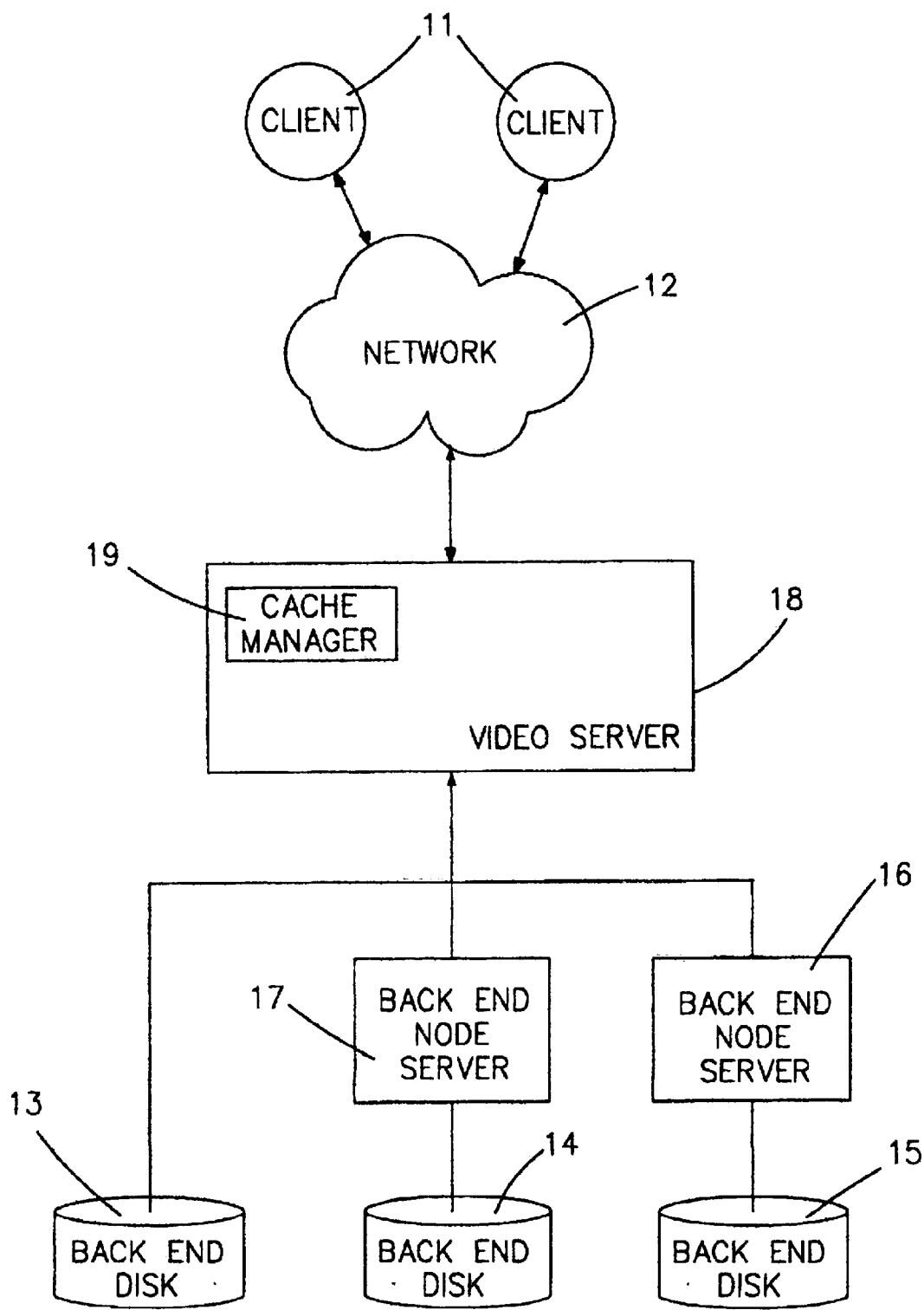
FIG. 1 is a block diagram of a video-on-demand system according to an embodiment of the present invention.

While the present invention can be applied to any traditional transaction processing environment in which caches and caching algorithms are employed, for the sake of clarity, the ensuing description will focus on implementation of the invention at a video server of the type illustrated schematically in FIG. 1. FIG. 1 is a block diagram of a video-on-demand system according to an embodiment of the present invention. It is assumed that clients 11 make requests to video servers 13 via a communication network 12. Clients can, for example, submit start, stop and read requests. Each video server 18 (only one shown) is connected to a back-end disk group, which may be composed of multiple disks, 13, and/or back-end servers, 16 and 17.

The back-end servers are possibly connected to their own disks or disk groups, 14 and 15. These disks associated with back-end servers and/or the back-end disk groups, which will most likely have different capacities, contain permanent copies of the videos. Each of the stored video segments is assumed to be made up of a plurality of blocks, with the blocks generally being stored on different disks. For the sake of the present description, a running example is to be used wherein a stored video segment is comprised of eight stored blocks. The blocks are stored at disks 13, 14 and 15 in accordance with the protocol whereby successive blocks are provided to each of the disks in the array in a specified order. Specifically, as shown in FIG. 1, video block 1 is stored at disk 13, block 2 at disk 14, block 3 at disk 15, block 4 at disk 13, block 5 at disk 14, block 6 at disk 15, block 7 at disk 13, and block 8 at disk 14.

The disk group is managed by a cache manager 19 located at the video server 18. Caching by the cache manager, as noted above, conserves server resources since the cached data does not have to be read from the back-end disks when serving successive streams, thereby reducing the needed back-end disk bandwidth. The video servers can be embodied as workstations (e.g. IBM RISC SYSTEM 6000) each having a first network adapter for interconnection with the communication network 12 and a second network adapter for interconnection to the fast switching network. The back-end disks 13, 14 and 15 can be embodied as either stand alone disks or as a striped group of disks such as a RAID-5 array. The cache manager 19 is preferably embodied as program code and data structures instantiated in the memory of the video server.

Figure 2:
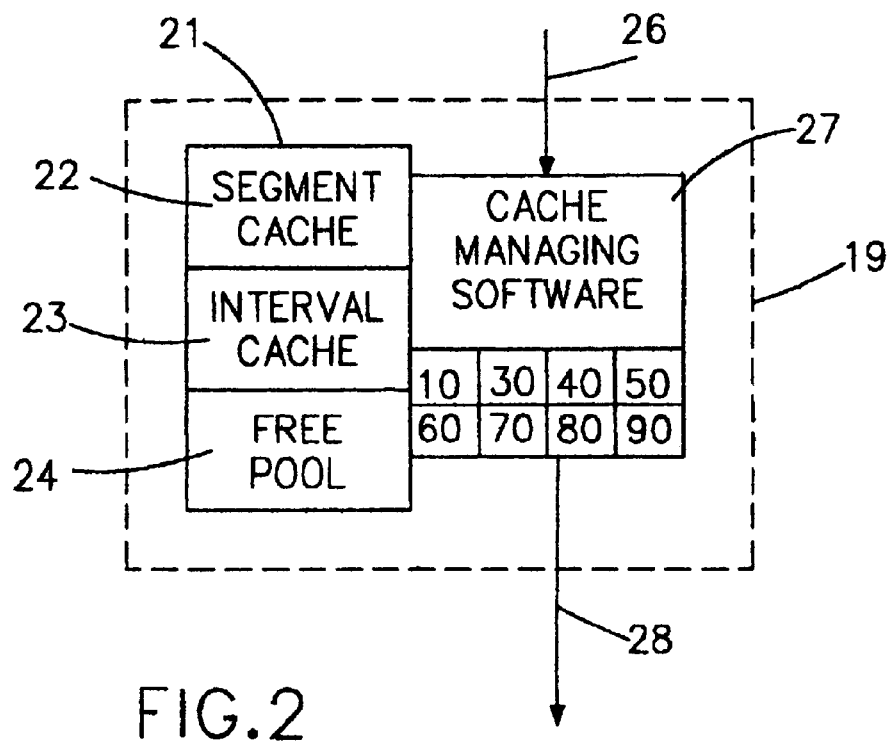
FIG. 2 is a block diagram of the cache manager of FIG. 1.
Figure 3:
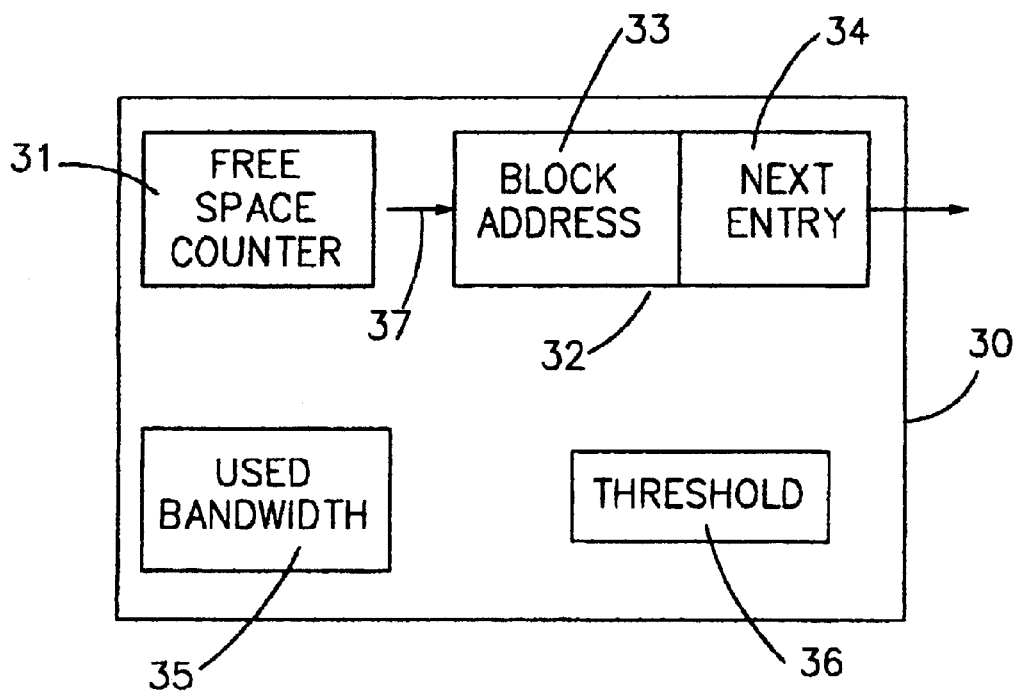
FIG. 3 illustrates the data structures in a cache manager of the present invention.

FIG. 2 is a block diagram of the cache manager 19. The cache memory 21 is divided into three parts, including the segment cache 22, the interval cache 23, and the free pool 24. The segment caching area 22 consists of the blocks belonging to video segments that are or will be completely cached. The interval caching area 23 consists of blocks belonging to video segments that are partially cached. The free pool 24 consists of blocks that are free; i.e. do not contain data from any video. Data requests 26 are received at the video server and passed to the cache management program 27 from users at the client locations. The needed data are then retrieved either from the back-end disks 13, 14 and/or 15 using a remote data stream, or from the cache 21 using a cache data stream. During or after transmission of the data via a data stream, the cache management program may choose to insert the blocks into the cache, if the data was obtained from one or more disks; or to retain or discard the blocks if they were retrieved from the cache.

The proposed method handles how to optimally cache the retrieved data blocks from the disks or disk groups assuming a disparity in the disk capacities. The unit to be cached could be any size. For example, the cached unit could be part of the video object (with a video object being a unit of users' access request, e.g., a video clip, or a whole movie, etc.), such as an interval as described herein, or the whole video object, which is hereinafter referred to as a segment. In the rest of the embodiment, the description assumes caching of blocks of an interval. However, other cases, such as segment caching, can be also easily understood from the description.

FIGS. 3 through FIG. 9 show the data structures, 10, 30, 40, 50, 60, 70, 80 and 90, which are maintained at the cache manager 19 for use in the operation of the present cache management method. For managing the free pool 24, each cache manager has a free pool counter 31 of FIG. 3 that keeps track of the number of unallocated blocks in the free pool. The value in the free pool counter is initially set to be equal to the size of the cache memory 21. There is also a free pointer 37 that points to a list of free block entries 32 containing the address of the free block 33 and a pointer to the next free block entry 34. The used bandwidth 35 is the total used bandwidth of the video server. Threshold 36 is used to determine whether to cache entire segments or fragments of segments. The threshold is set to a predetermined value close to but less than the maximum bandwidth of the video server (e.g. 80% of the maximum bandwidth). If close to or at the threshold, entire segments cannot be cached.

Figure 4:
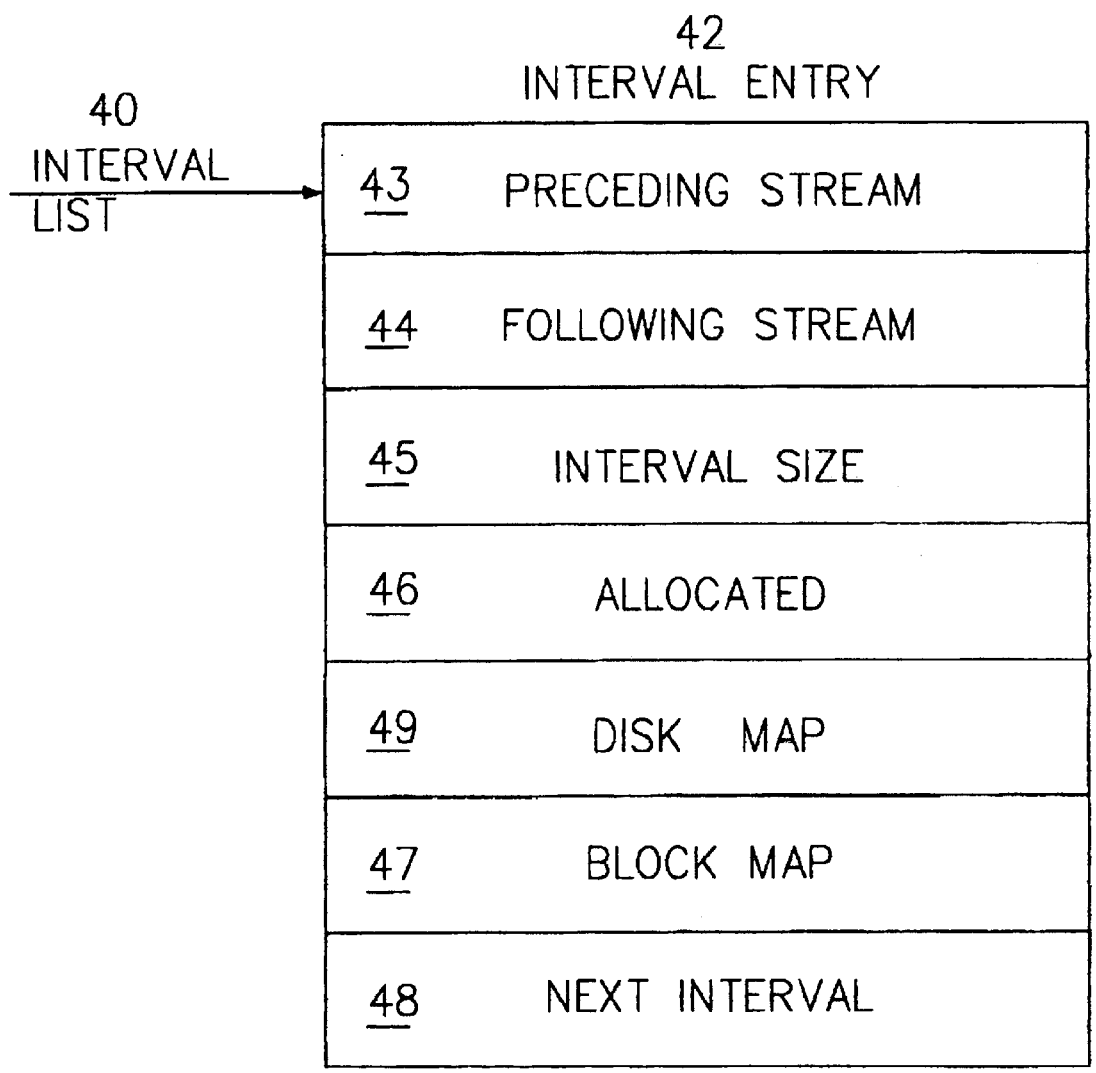
FIG. 4 illustrates an interval entry in accordance with the present invention.
Figure 7:
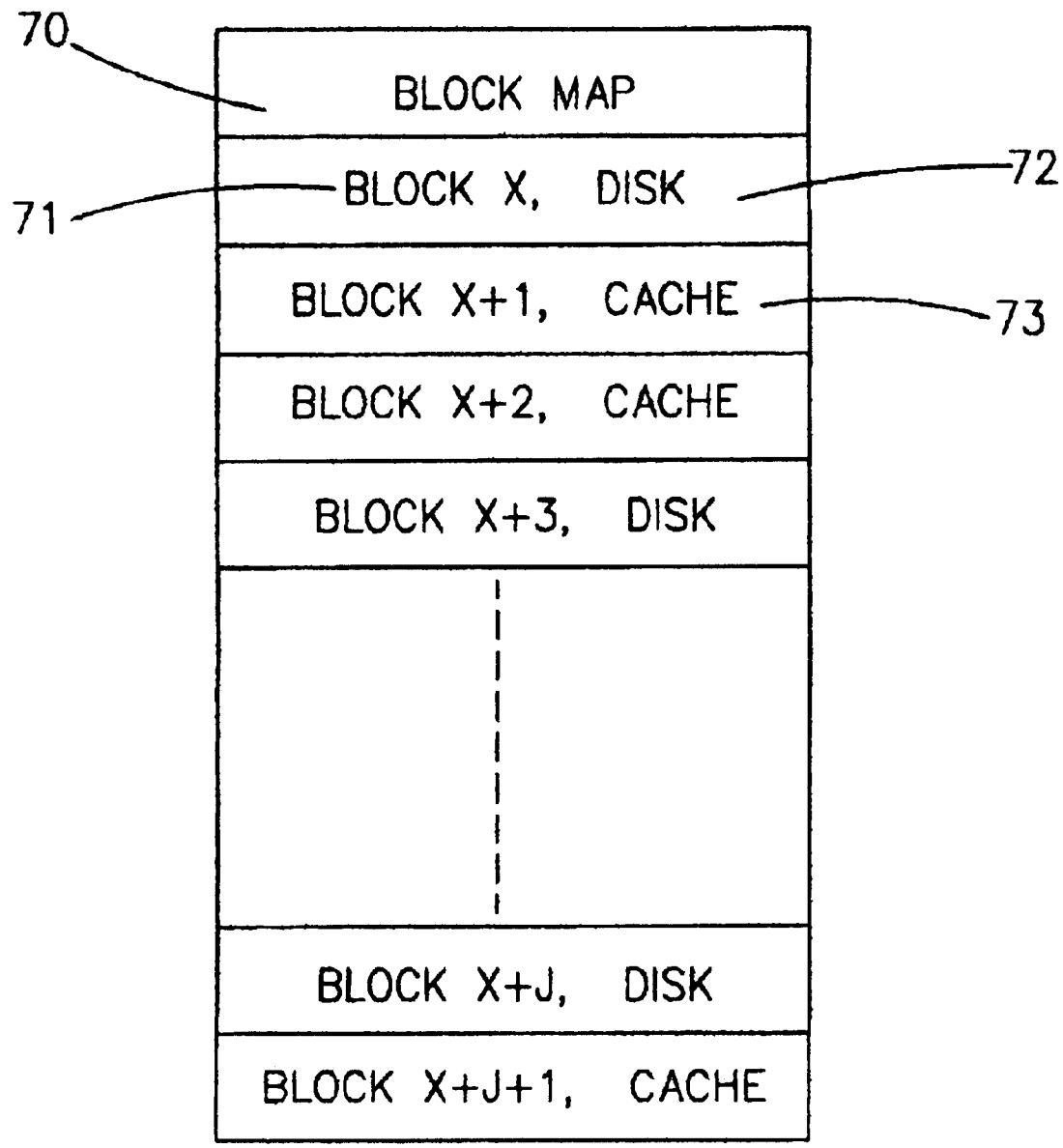
FIG. 7 illustrates a block map created in accordance with the present invention.
Figure 10:
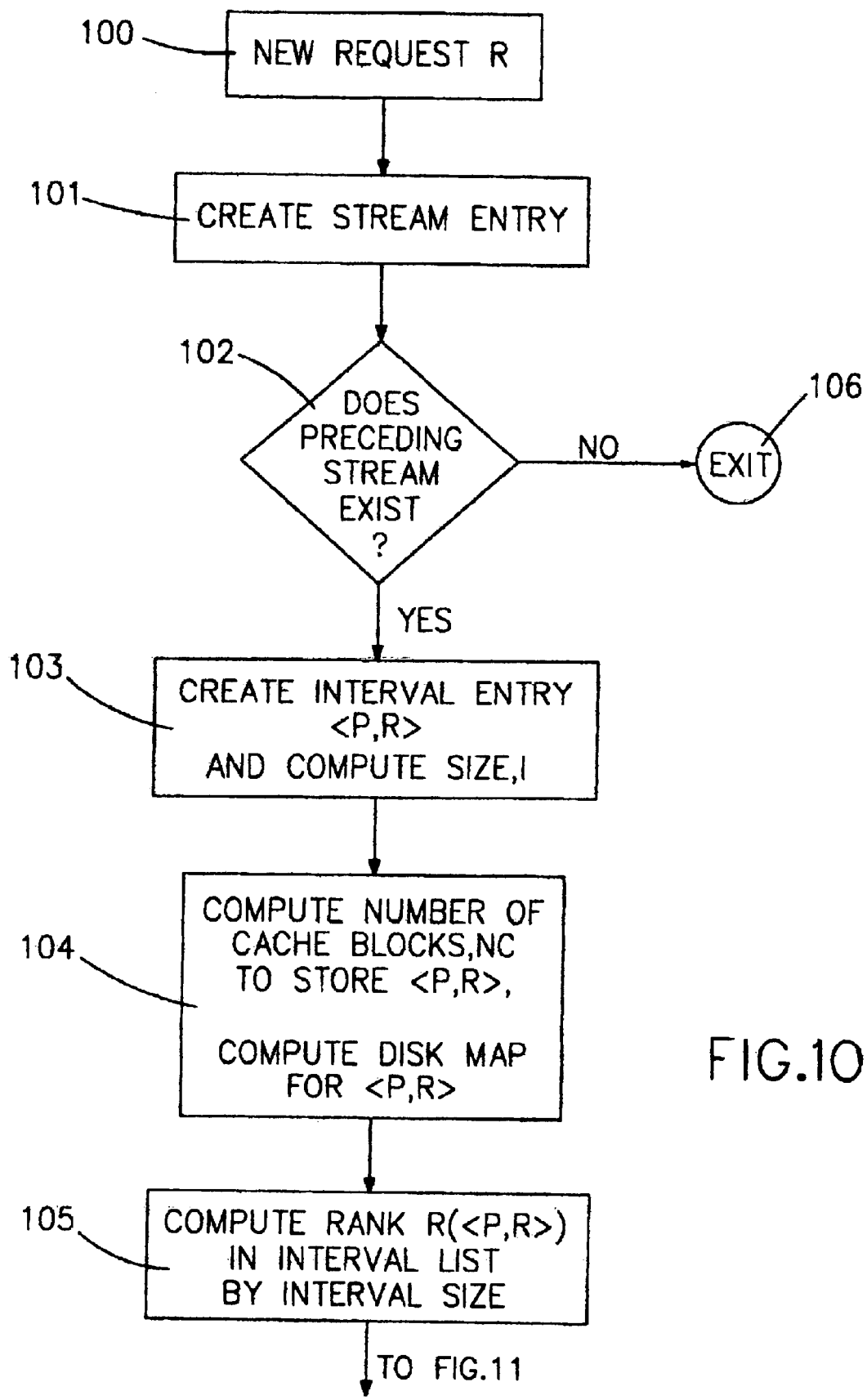
FIGS. 10 through 11 show the process flow for the cache manager handling a new request for a stream made by a client.

The interval list 40 of FIG. 4 contains a list of the intervals formed by pairs of consecutive streams viewing the same video. The cache manager may decide (as described below) to serve the later stream of the pair from the cache by retaining some of the blocks read by the earlier stream. The list consists of interval entries 42. The preceding stream 43 of an interval entry 42 is the identifier of the earlier stream of the pair while the following stream 44 is the later stream of the pair. The interval size 45 is the number of blocks read by the preceding stream that need to be retained for use by the following stream and is equal to the distance between the two streams while reading the video file. The "Allocated" field 46 is the number of cache blocks allocated to the interval. The next interval field 48 is a pointer to the next interval entry 42. The disk map 49 is used to decide if the blocks in an interval are cached to the memory or discarded. The interval list 40 is sorted on the interval size, 45. The "block map" 47 ( and as further detailed in FIG. 7) is a list which shows each block 71 in the interval and the location (72 and 73) from which to retrieve the data block, i.e., either the cache (73 and 21) or the disk (72).

FIG. 5 shows a Disk Map 50. The Disk Map contains a disk id 52, cache distribution factor CDF 53, and cache distribution counter CDC 54 for each disk in a disk striping group. These values are used to decide if each block in an interval will be cached or not. The values CDC and CDF may be assigned for each disk in a preferred embodiment. The cache distribution factor (CDF) 53 of a disk is the predetermined constant which is used to compute how many blocks of an interval stored in that disk are going to be cached. The cache distribution counter (CDC) 54 of a disk is the counter which is used to decide if a new block which is inserted to the interval is going to be cached or not. In this preferred embodiment, the CDF will indicate the ratio of the blocks from a disk which are to be cached; for example, if the CDF value of a disk Di is 3, every third block will not be cached; or equivalently, 2 blocks from disk Di will be cached while leaving one block not cached.

An alternative method for implementing the proposed method is to use a Disk Access Table as shown in FIG. 6. A Disk Access Table can be used instead of the Block Map (FIG.7) and Disk Map (FIG. 5). In this case, for each disk 62, it is determined whether all of the blocks from the disk are accessed from the cache (in which case access flag entry 63 is No) or all of them are accessed from the disk ( in which case access flag entry 63 would be Yes). The remainder of the description will refer to the implementation using the Disk Map and Block Map; though, it will be clear to one having skill in the art that the Disk Access Table implementation could be readily substituted therefor.

The segment table 90 of FIG. 9A contains an entry for each video segment, with the entry consisting of the segment id 91, the segment size 92 which specifies the number of cache blocks required by the segment, the cache status field 93 which specifies whether or not the segment is cached, and statistics 94 such as the inter-reference time which is used to decide whether to retain the segment in the cache. The cache status field 93 may be TRUE if the segment is cached and FALSE otherwise. The stream table 60 contains an entry for each stream (FIG. 9B). The entry consists of the stream id 95, the stream state or status 96, the cache access flag 97 for the stream, the video id 98 containing the id of the video being watched by the stream, and the position 99 which contains the position of the stream in the video. The stream state 96 may be RETAIN.; indicating that blocks read by the stream are to be retained or DISCARD, indicating the blocks are to be discarded. The cache access flag 97 may be TRUE or FALSE to indicate that the stream is accessing (writing or reading) or not accessing the cache, respectively. FIG. 8 shows a disk status table 80. The disk status table 80 lists each disk id 81, its remaining capacity 82, and the total capacity 83.

The handling of a new request R is shown in FIGS. 10 through 13. Upon receipt of a request 100, a stream table entry is created at step 101 for the new request. The stream table entry is created in stream table 90. In step 102, the cache manager checks the stream table 90 to see if there is a preceding stream P for the same video. If there is no preceding stream, the cache manager exits in step 106 and the requested video is retrieved from disk. If, however, there exists a preceding stream, at step 103 a new interval entry 42 is created for the interval (<P,R>) and the interval size I 45, of the interval <P,R> is computed. The interval entry 42 is inserted into the interval list 40. Next, in step 104, the cache manager computes the number of cache blocks, NC, required to store the interval <P, R> and computes the disk map 50 (FIG. 5) for the interval <P, R>. The foregoing computations are described in greater detail with reference to FIG. 12 and FIG. 13, below. Then, in step 105, the cache manager computes the rank R(<P, R>) of the interval <P, R> in the interval list 40 according to the interval sizes.

Figure 11:
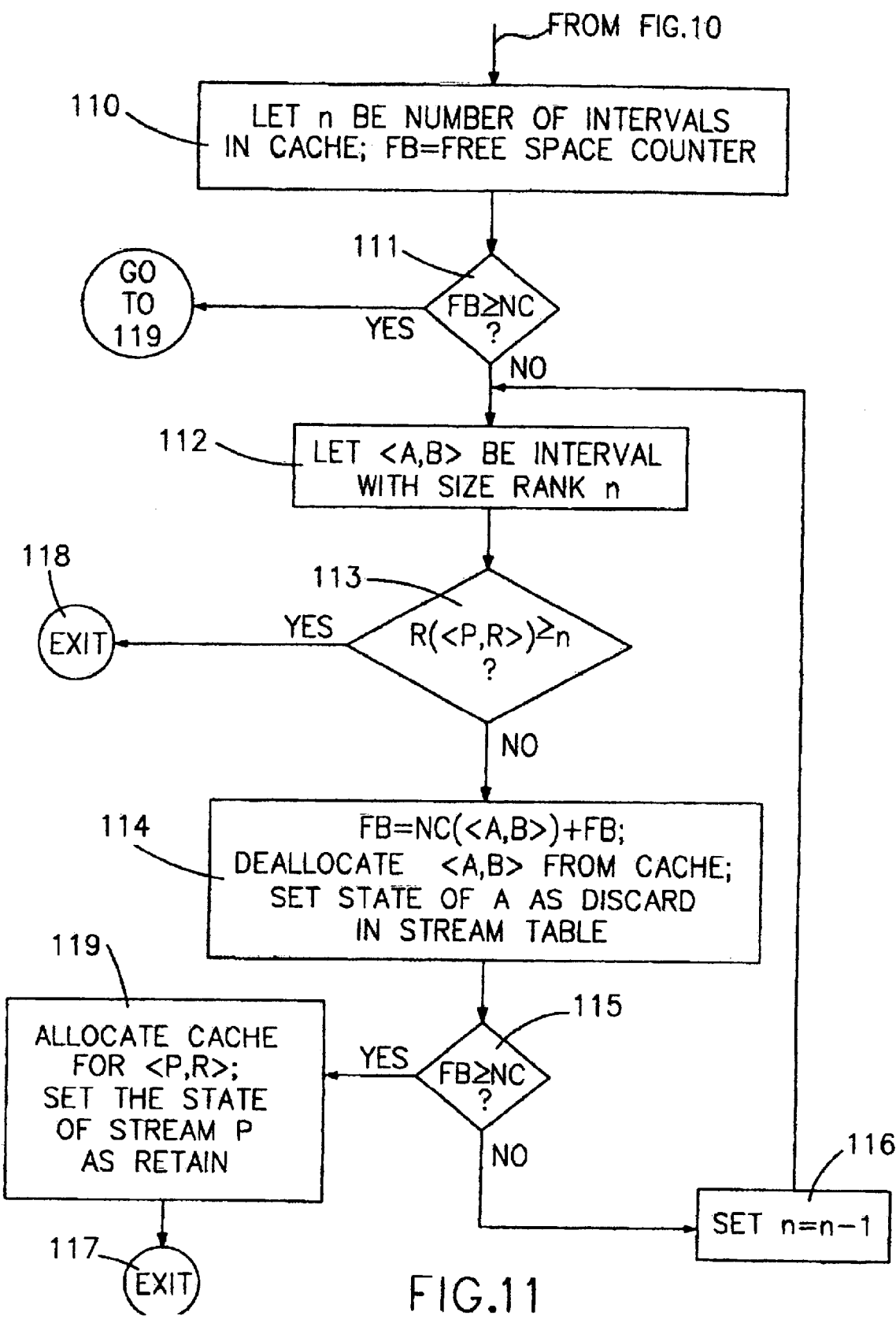

The decision of whether the new interval is going to be cached or not is next made. Also, if the interval is going to be cached, it should be determined if any other streams must be removed from the cache to make room for the new stream, as shown in FIG. 11. At step 110, the number of blocks to be freed (FB) is set to the current value of Free Space Counter 31 and n is set to the number of intervals in the cache. Then, in step 111, it is determined whether the number of free blocks, FB, is larger than the number of blocks needed for the new interval <P, R>, i.e. NC. If FB is greater than or equal to NC, the interval <P, R> is cached without replacing any other interval(s). This is done by going to step 119. If FB does not exceed NC, the process goes to step 112. In step 112, the nth interval is selected, whose rank in size is n, and that interval is designated as interval <A,B>. Next, in step 113, it is determined if the rank of the current interval <P,R> is larger than or equal to n (.i.e., if the length of the <P, R> is longer than the length of the interval <A,B>). If longer, then the cache manager exits at step 118, under the assumption that <P,R> is too large to be cached. Otherwise, the processing continues to step 114. In step 114, the number of cache blocks for the interval <A,B>, denoted as NC(<A,B>) is added to the current value of FB, which is the number of blocks to be freed. Then, those blocks are freed to the free pool 24. Also at 114, the free space counter 31 is incremented by the number of cache blocks allocated to the interval <A,B>, i.e., NC(<A,B>), the state of stream A is set to DISCARD, and the used bandwidth 35 is adjusted.

In step 115, it is determined if the number of blocks freed so far, (i.e., the current value of FB) is larger than the number of cache blocks to be allocated for the new interval <P, R>, i.e., NC. If so, in step 119, the cache manager allocates cache to <P, R> by setting the allocated field 46 to the interval size, decrementing the free space counter 31 by the number of the cache blocks, NC, setting the state 96 of stream P to RETAIN, and incrementing the used bandwidth of the cache 35. Then, the cache manager exits to step 117. Otherwise, in step 116, n is decremented by 1 and the process returns to step 112 to evaluate the next interval <A, B>.

Figure 12:
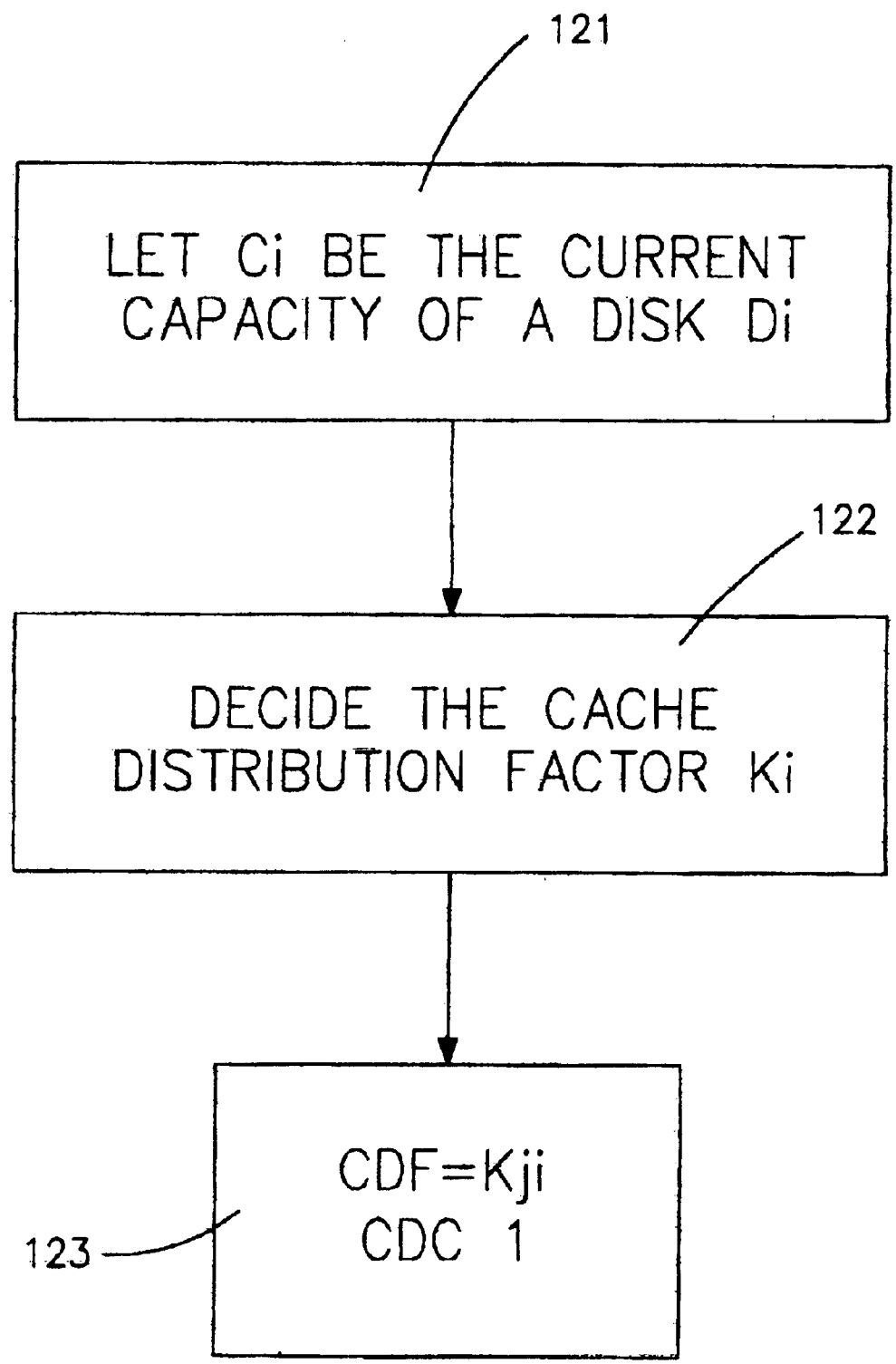
FIG. 12 depicts the process flow for computation of a disk map for a new interval under the present invention.

FIG. 12 shows the steps for the computation of a disk map, 50 of FIG. 5 for the new interval <P, R>. The steps 121 through 123 are executed for each disk Di in the back-end disk group. For a disk Di, in step 121, the current capacity (remaining capacity 82) is set to Ci. Then, in step 122, the distribution factor Ki is computed as will be later seen. Then, in step 123, CDF is set to Ki and CDC is set to 1.

Figure 13:
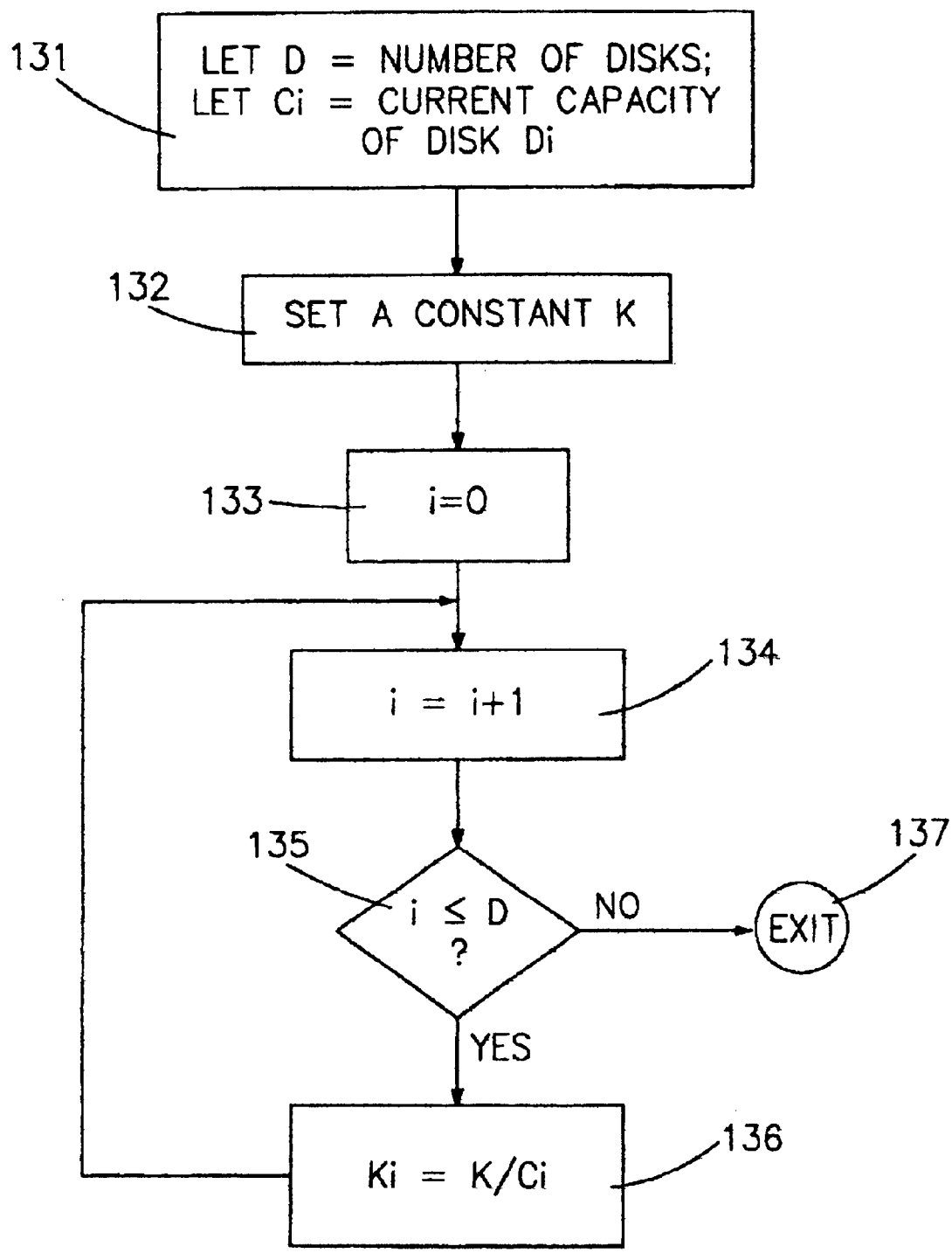
FIG. 13 provides a process flow for determining the cache distribution factors in accordance with the present invention.

FIG. 13 shows the steps to decide the cache distribution factors for each disk. In step 131, D is set to the number of Disks in the backend nodes. Also, C_i is set to the current capacity of a disk Di (from 82). Then, in 132, a constant K is selected. There could be many methods for selecting this constant K. Next, in step 133, i is set to 0 and i is incremented by 1 in step 134. Then, in step 135, it is determined if the current value of i is less than or equal to the number of disks D. If greater than the number of disks D, the cache manager exits to step 137. Otherwise, the cache distribution factor Ki is set to K/C_i in step 136. Then, the processing proceeds to step 134. There could be many different ways of deciding CDF, K, and Ki other than described above. For example, Ki can be set as Ki=K*M/Ci where M=C_1+C_2+C_3+ . . . C_D. As mentioned before, an alternative method can use the Disk Access Table of FIG. 6 instead of the Disk Map and Block Map. In the case of the Disk Access Table, the assigning of a CDF and of a CDC is not required. In this case, a threshold value T may be selected; and, if C_i>T, Access Flag 63 would be set to "No", meaning that the data from disk Di will not be cached. Alternatively, the flag may be set to "Yes".

Figure 14:
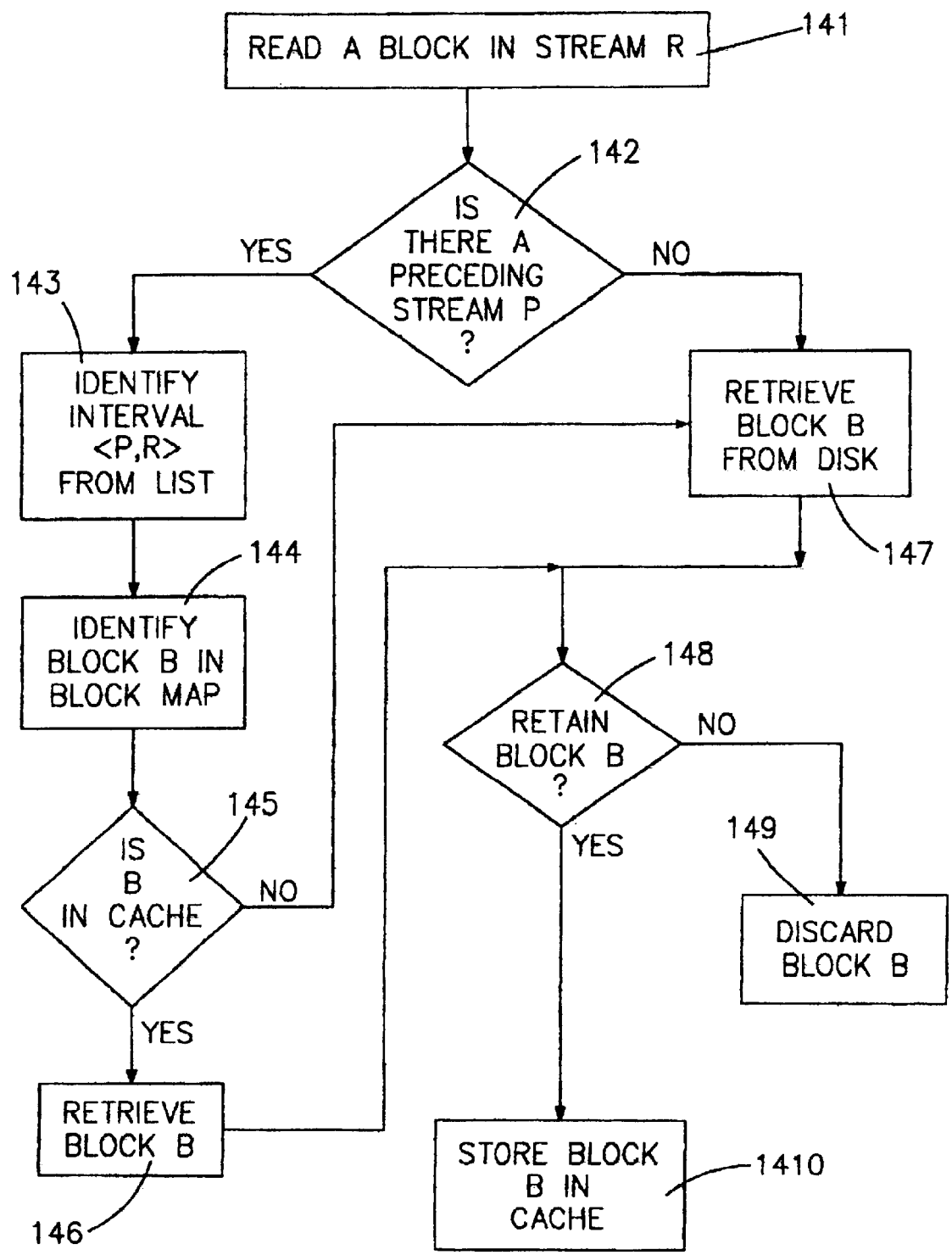
FIG. 14 shows the handling, by the cache manager of a read request made by a client.
Figure 15:
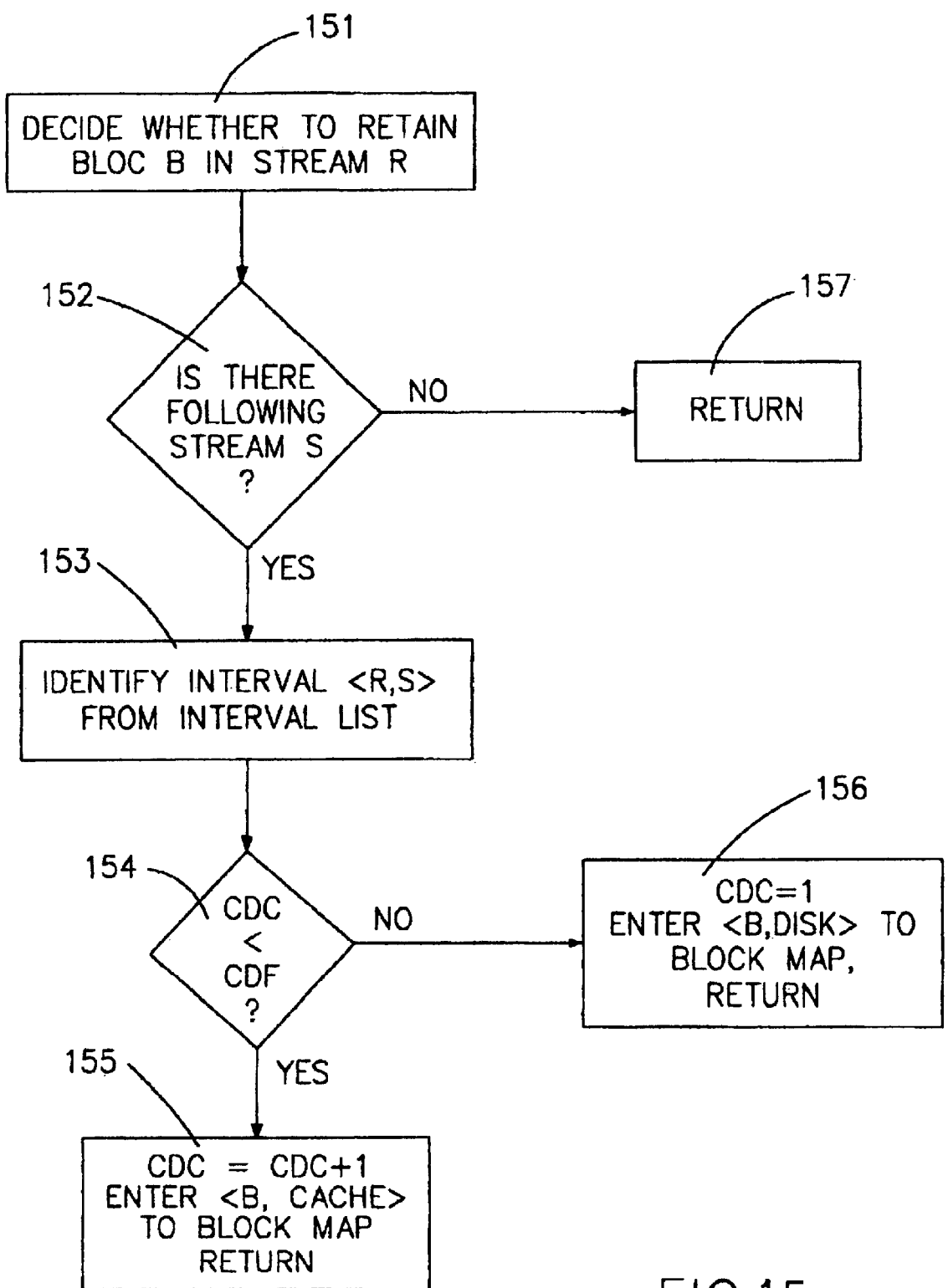
FIG. 15 provides the process flow details for step 148 of FIG. 14 for determining whether to retain a block.

The handling of a read request to a block B in a stream R is shown in FIGS. 14 to 15. In step 142, the cache manager checks if there is a preceding stream P to the stream R. If there is, the process goes to step 143. Alternatively, if there is no preceding stream, the process goes to 147. In step 143, the cache manager identifies the interval <P, R> from the interval list. Next, it identifies the block B in the Block Map in step 144. At step 145, the cache manager checks if the block B is in the cache by inspecting the identified block map. If it is in the cache, the process goes to step 146. Otherwise, the process continues to step 147. In step 146, the block B is retrieved from the cache, whereas in step 147, the block is retrieved from the disk.

In step 148, it is determined if the block B is going to be retained. The details of the determination are shown in FIG. 15. If the result is "RETAIN", the cache manager stores the block B in the cache. Otherwise, it discards block B. FIG. 15 shows the steps for determining whether the retrieved block B in stream R is to be retained in the cache or not. In step 152, it is checked if there is a following stream S. If not, the block is not retained and therefore a "DO NOT RETAIN" response is returned in step 157. If, however, there is a following stream S, then in step 153, the cache manager identifies the interval <R, S> from the interval list. Next, in step 154, the cache manager looks into the interval entry and determines whether the caching distribution factor (CDF) is larger than the caching distribution counter. If so, the CDC is incremented by 1, <B, Cache> is inserted to the block map, and a "RETAIN" response is returned in step 155. Otherwise, in step 156, CDC is set to 1 and <B, Disk> is inserted into the block map.

As noted earlier, the CDF for each device will reflect its capacity; and, therefore, to optimally make use of the device capacities, the "Retain" determination of FIG. 15 of the preferred embodiment relies on that CDF value. For the eight block video segment depicted as stored in devices 13, 14 and 15 of FIG. 1, the blocks may be treated differently depending upon the CDF for the respective devices and the cache capacity. Assuming that the available cache space will accommodate five of the eight blocks of the requested video, the inventive system and method must be invoked to ascertain which of the blocks will be retained in the cache and which will be discarded, only to be retrieved directly from their respective disks as needed. Assuming that disk 13, which stores blocks 1, 4 and 7, is an older device which is relatively slow, it will have a higher CDF than will the other disks of the striping group. For the sake of the present example, assume that disk 14 which stores blocks 2, 5 and 8, is somewhat more efficient that disk 13 and has an intermediate CDF value, and that disk 15, which stores blocks 3 and 6, is a new device which is quite responsive and has a lower CDF than either 13 or 14. An example of CDF values for disks 13, 14 and 15 provides a value of infinity for disk 13 (such that everything will be cached), a CDF of 3 for disk 14 and a CDF of 0 for disk 15. Applying the present method, it will be determined that all blocks from disk 13 (i.e., blocks 1, 4 and 7) should be cached, that two out of three blocks from disk 14 (i.e., blocks 2 and 8) should be cached, and that no blocks should be cached from disk 15. Under such an arrangement, the speed of disk 15 and that of the cache can be used advantageously to compensate for the relatively slow response time of disks 13 and 14.

Figure 16:
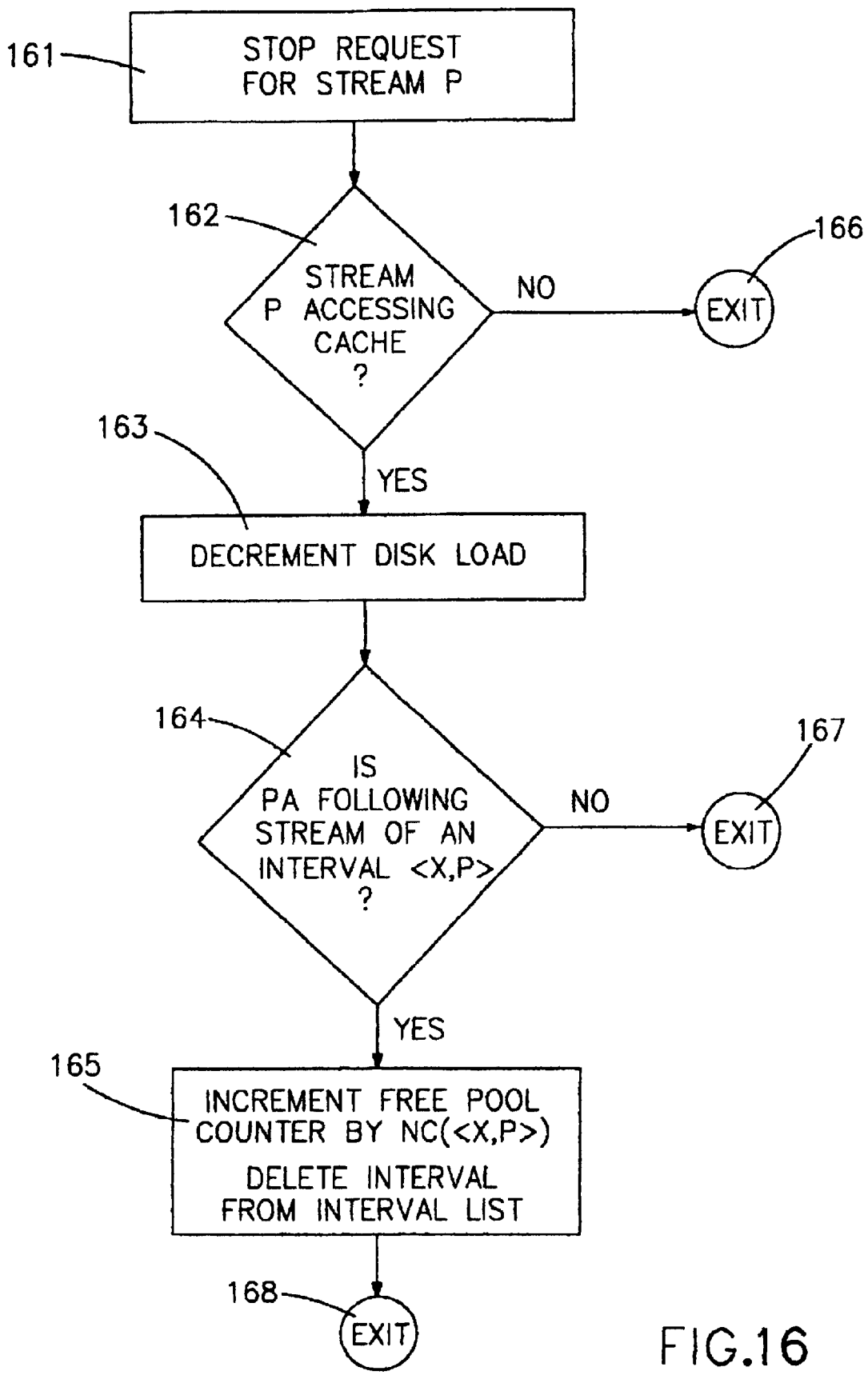
FIG. 16 shows the processing, by the cache manager, of a stop request from a client.

FIG. 16 is a block diagram of the processing of a stop request for a stream P. In step 162, the cache manager checks the access flag 97 of the stream P to determine whether the stream P was accessing the cache. If not, the cache manager exits at step 166. If the stream was accessing the cache, the used bandwidth 35 is decremented. In step 164, the cache manager next checks whether the stream is the following stream of an interval, (i.e., if there exists a stream X such that <X, P> is an existing interval). If not the cache manager exits in step 167. Otherwise, the cache manager increments the free pool counter 31 by the number of cache blocks allocated to the interval, i.e., NC (<X, P>), and deletes the interval entry 42 from the interval list 40. In step 167, the cache manager exits.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A method for increasing the data rate for provision of data from a plurality of devices in a striping group associated with a server in response to client requests comprising the steps of:
   evaluating the respective capabilities of each of the plurality of devices in the striping group;
   retrieving data in response to a first client request;
   determining if said data is to be used again for a successive client request; and
   selectively caching data from said plurality of devices, which data is to be used for a successive client request, in accordance with said capabilities.

2. The method of claim 1 wherein said selectively caching comprises caching data from less than all of said plurality of devices.

3. The method of claim 1 wherein said selectively caching comprises caching less than all of said data.

4. The method of claim 1 wherein said selectively caching comprises caching non-consecutive data.

5. The method of claim 1 wherein said selectively caching comprises the steps of:
   identifying data to be cached;
   computing the number of cache blocks required to store said identified data to be cached; and
   determining if said identified data can be cached based on said computed number of cache blocks.

6. The method of claim 5 wherein at least one interval is already stored at said cache and wherein said determining if said data can be cached further comprises deallocating at least one interval from said cache.

7. The method of claim 1 wherein said evaluating said respective capacities comprises calculating a cache distribution factor for each of said plurality of devices.

8. The method of claim 1 wherein said retrieving data comprises the steps of:
   determining if a preceding stream exists for said data;
   ascertaining the storage location for said preceding stream; and
   accessing said preceding stream from its storage location.

9. A server for optimizing the data rate for provision of requested data to a client, said data being stored in a striping group comprising a plurality of devices associated with said server, comprising:
   at least one cache memory for storing data;
   a cache manager for receiving client requests for data, said cache manager comprising a cache management component for selectively caching data from said plurality of devices in said striping group; and
   wherein said server comprises at least one component for evaluating the respective capabilities of each of the plurality of devices and wherein said selectively caching data from said plurality of devices in said striping group comprises caching based on said respective capabilities.

10. The server of claim 9 wherein said cache management component comprises said at least one component for evaluating the respective capabilities of each of the plurality of devices.

11. The server of claim 10 wherein said at least one component for evaluating the respective capabilities of each of said plurality of devices comprises a disk map component for assigning at least a cache distribution factor to each of said plurality of devices.

12. The server of claim 10 wherein said at least one component for evaluating the respective capabilities of each of said plurality of devices comprises a disk access table including at least a cache distribution factor to each of said plurality of devices.

13. The server of claim 9 wherein said cache manager further comprises a component for determining if said requested data is to be used again for a successive client request.

14. The server of claim 9 wherein said cache management component includes means for identifying data to be cached; computing the number of cache blocks required to store said identified data to be cached; and determining if said identified data can be cached based on said computed number of cache blocks.

15. The system of claim 14 wherein at least one interval is already stored at said cache and wherein said determining if said data can be cached further comprises deallocating at least one interval from said cache.

16. A program storage device readable by machine, tangibly embodying a program of instructions executable by the machine to perform method steps for a cache management component to increase the data rate for provision of data from a plurality of devices in a striping group associated with the component in response to client requests, said method steps comprising:

evaluating the respective capabilities of each of the plurality of devices in the striping group;

retrieving data in response to a first client request;

determining if said data is to be used again for a successive client request; and selectively caching data from said plurality of devices, which data is to be used for a successive client request, in accordance with said capabilities.

17. A video server for optimizing the data rate for provision of requested video data to a client, said video data being stored in a striping group comprising a plurality of devices associated with said video server, comprising:

at least one cache memory for storing video data; and a cache manager for receiving client requests for video data, said cache manager comprising a cache management component for selectively caching data from said plurality of devices in said striping group, said cache management component including at least one device access data structure for evaluating the respective capabilities of each of the plurality of devices, and wherein said selectively caching data from said plurality of devices in said striping group comprises caching based on said respective capabilities.

18. The video server of claim 17 further comprising a component for determining if said requested video data is to be used again for a successive client request.

19. The video server of claim 17 wherein said cache management component includes means for identifying data to be cached; computing the number of cache blocks required to store said identified data to be cached; and determining if said identified data can be cached based on said computed number of cache blocks.

20. The video server of claim 19 wherein at least one interval is already stored at said cache and wherein said cache management component deallocates at least one interval from said cache.

* * * * *